(No Model.) 8 Sheets—Sheet 1.

J. A. TREAT.
CASH REGISTER.

No. 474,614. Patented May 10, 1892.

Fig. 1.

Witnesses:
Geo. A. Gregg.
N. L. Lindop.

Inventor
Joseph A. Treat.
By James Whittemore
Att'y.

(No Model.)

J. A. TREAT.
CASH REGISTER.

No. 474,614. Patented May 10, 1892.

Fig. 4.

Witnesses
Geo. G. Gregg
N. L. Lindop

Inventor
Joseph A. Treat
By James Whittemore
Atty (No Model.)   J. A. TREAT.   8 Sheets—Sheet 5.
CASH REGISTER.

No. 474,614.   Patented May 10, 1892.

Fig. 6.

Witnesses
Geo. A. Gregg.
N. L. Lindop.

Inventor
Joseph A Treat.
By James Whittemore
Atty.

(No Model.) 8 Sheets—Sheet 6.

J. A. TREAT.
CASH REGISTER.

No. 474,614. Patented May 10, 1892.

Witnesses
Geo. A. Gregg.
N. L. Lindop.

Inventor
Joseph A. Treat.
By James Whittemore
Atty (No Model.) 8 Sheets—Sheet 7.

J. A. TREAT.
CASH REGISTER.

No. 474,614. Patented May 10, 1892.

Witnesses:
Geo. A. Grigg.
N. L. Lindop.

Inventor
Joseph A. Treat
By James Whittemore
Atty (No Model.)　　　　　　　　　　　　　　　　8 Sheets—Sheet 8.
J. A. TREAT.
CASH REGISTER.

No. 474,614.　　　　　　　　　Patented May 10, 1892.

UNITED STATES PATENT OFFICE.

JOSEPH A. TREAT, OF STUART, IOWA.

CASH-REGISTER.

SPECIFICATION forming part of Letters Patent No. 474,614, dated May 10, 1892.

Application filed April 14, 1890. Serial No. 347,866. (No model.)

*To all whom it may concern:*

Be it known that I, JOSEPH A. TREAT, a citizen of the United States, residing at Stuart, in the county of Guthrie and State of Iowa, have invented certain new and useful Improvements in Cash-Registers, of which the following is a specification, reference being had therein to the accompanying drawings.

This invention relates to new and useful improvements in cash-registers; and the invention relates to that class of registers in which there is a series of keys operating a series of tablet-rods, a registering mechanism, and a recording mechanism for recording the individual sales, as well as registering the total amount thereof.

The invention consists in the improved construction, arrangement, and combination of the various parts, and more especially as to the following particulars: First, the arrangement of the keys in a single bank or group of ten when using the decimal system, comprising a cipher-key and nine numerals, and in the construction of the keys and indicating mechanism, whereby the indication of the amount is not commenced until the registration is completed or nearly completed, and in the mechanism for preventing the simultaneous operation of two or more keys upon the tablet-rods; second, the construction and arrangement of the connection between the keys and the tablet-rods, whereby a single striker-arm is moved to operate any desired tablet-rod; third, the construction of the registering mechanism, whereby the total is always indicated by reading the numbers exposed upon the adjacent wheels and whereby the registering-wheel of any denomination may be operated independently of any other, all of said wheels being coacting—that is, acting one upon the other; fourth, in the arrangement and construction of the tablet-rods; fifth, in the construction and arrangement of the recording mechanism; sixth, in the peculiar construction, arrangement, and operation of a hood for covering and uncovering the operated tablets; seventh, in the construction and operation of the alarm mechanism and operating mechanism therefor, and, eighth, in the peculiar construction, arrangement, and combination of the various parts, all as more fully hereinafter described.

In the drawings which accompany this specification.

1 is the frame of the machine, supporting the operating parts.

2 are the operating-keys, consisting, when used in the decimal system, of a single group of ten. Each key has a suitable finger-piece 3, upon which is placed a number. These keys are numbered from 1 to 9, inclusive, the left-hand key being No. 1. The tenth key 4 is a cipher-key and is arranged at the right of the machine. This arrangement is not essential, and any other arrangement may be made.

Figure 2:
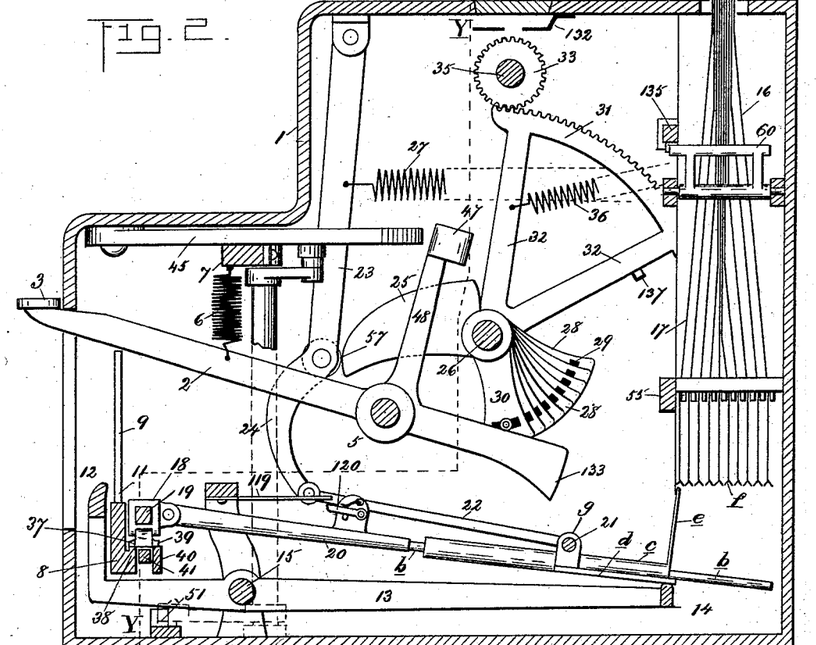
Fig. 2 is a vertical cross-section on line $x\ x$ in Fig. 1.
Figure 3:
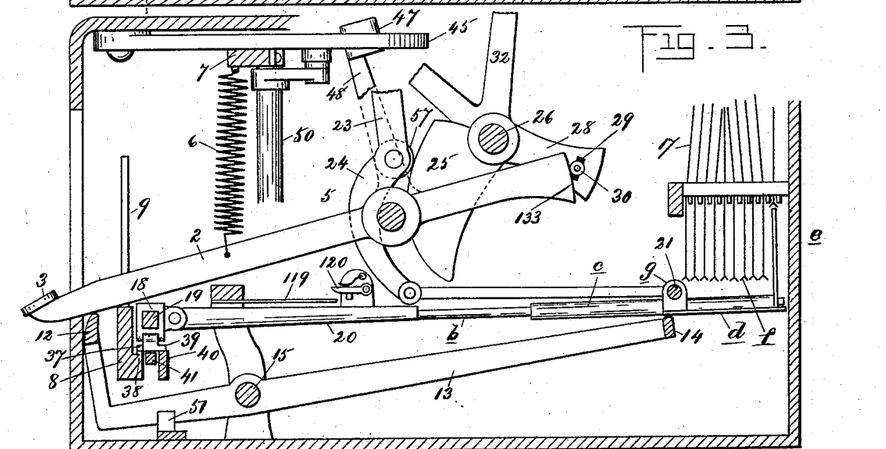
Fig. 3 is a section similar to Fig. 2, showing the key depressed.

5 is a shaft upon which all the keys are journaled. Each key is held in its normal unoperated position by a spring 6, connected at its lower end to the key, and at its upper end to the bar 7, as shown in Figs. 2 and 3. Below the keys is slidingly secured the bar 8, which on its upper side is provided with the arms 9, one under each key.

A are standards carrying the projections B, engaging in the slots C of the bar 8 and forming the support and guide therefor. The arms 9 have an incline 10, extending nearly their whole length, and the vertical portion 11. While the key is being depressed, it rests upon the incline, thereby moving the bar 8 to the left until the key reaches the vertical portion 11, when the bar remains stationary, while the key continues its downward movement over the portion 11 of the arm 9. As soon as the key is raised, the bar 8 is carried to the right by the tension of the spring 134. In front of the bar 8, and with its upper edge opposite the vertical portion 11 of the arms, is the bar 12, connected to the tablet-operating lever 13, which is connected at its end by the bar 14, the whole making a rectangular frame, secured upon the shaft 15, which is pivotally supported in bearings secured to the frame. The bar 14 is arranged immediately in front of the tablet-rods 16, which are arranged in groups of ten from front to back, each group representing a denomination.

In the drawings I have shown five groups, representing cents, dimes, dollars, tens, and hundreds, arranged from left to right, respectively, the customer reading the numbers upon the back of the tablets. The front rod 17 of each group bears a tablet marked zero, the remaining rods bearing tablets marked, respectively, from 1 to 9 from front to rear.

18 is a sleeve slidingly secured upon the rod 19, secured transversely to the machine immediately behind the bar 8 and carrying at its rear side the tablet-operating rod 20, pivoted thereto, preferably of the shape shown—that is, consisting of the bifurcated frame $a$, forming a brace against lateral strain, to the end of which is secured the rod $b$, upon which is slidingly secured the hollow sleeve $c$. To this sleeve $c$ is secured the plate $d$, which forms a broad bearing upon the bar 14, and which carries the upwardly-projecting tablet-lifting arm $e$, adapted to engage with the inverted-V-shaped bearing $f$, formed on the bottom of the tablet-rods, as hereinafter described. The hollow sleeve $c$ has formed upon it centrally the guide groove or bearing $g$, which slidingly engages with the bar 21, which is connected by the arms 22 with the swinging hangers 23, pivoted to the top of the machine, one on each side of the key-levers. The hangers have the curved portion 24, formed to avoid the shaft 5 in their movement, and each is provided with a roller or bearing-block 57, against which the cams 25 bear, this cam being secured upon the rock-shaft 26. The hangers 23 are held with the roller 57 in contact with the cams by the tension of the spring 27, connected to the back of the machine, as shown in Fig. 2. The shaft 26 carries a series of rock-arms 28, one for each numeral-key. Each rock-arm is provided with the slot 29, in which is adjustably secured in any suitable manner the pin 30, arranged in the path of the key-levers. These rock-arms are arranged at a gradually-increasing distance from the key-levers from right to left, so placed that the shaft will be rocked through the greatest arc of a circle by the "9" key and through the least arc by the "1" key, correspondingly moving the segment 31, secured at the left end of the shaft 26 upon the arms 32 and engaging with the gear-wheel 33 of the registering mechanism, consisting of a train of coacting registering-wheels 34 upon the shaft 35 at the top of the machine, and upon which the gear-wheel 33 is loosely journaled. The segment is normally held in its initial position by means of the spring 36. (Shown in Fig. 2.)

Figures 10, 12, 13:
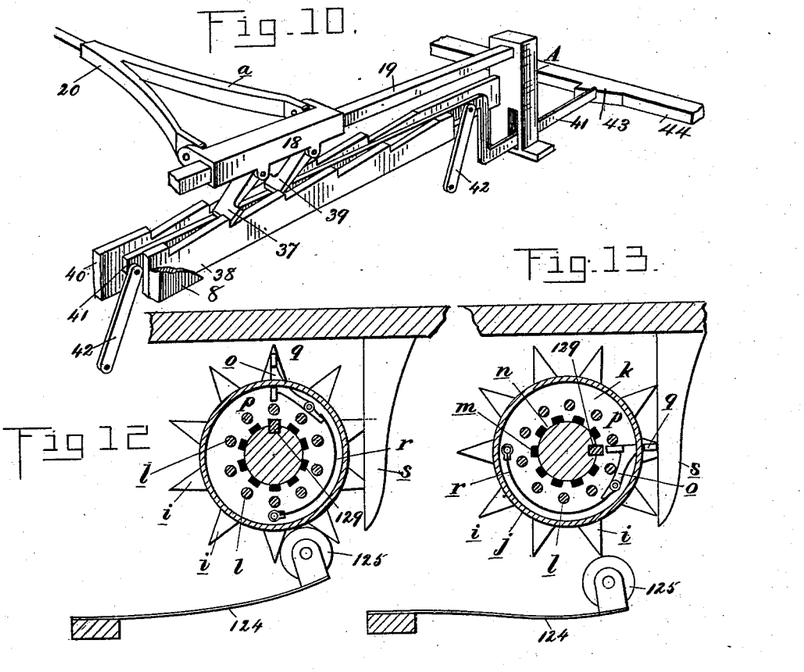
Fig. 10 is a diagram perspective showing the shifting tablet-arm and its operating mechanism.
Fig. 12 is a cross-section thereof on line $x'\ x'$ in Fig. 11.
Fig. 13 is a similar cross-section showing a different point of operation.

The registering mechanism will be more fully hereinafter described. The sleeve 18, carrying the sliding extensible tablet-operating arm 20 is operatively connected to the bar 8 by means of the spring-pawl 37, engaging with the ratchet-bar formed on or secured to the rear side of the bar 8, Fig. 10. The sleeve 18 is also provided with a spring-pawl 39, engaging with the stationary ratchet-bar 40, secured parallel to the bar 8. Each of these pawls have portions extending partially over the space between the stationary and movable ratchet-bars, adapted to be struck by the swinging bar 41, extending beneath such portions of the pawls and supported by the links 42. Said swinging bar is adapted to be raised to disengage the pawls simultaneously by the cam or lug 43, Fig. 7, upon the rod 44, which is slidingly secured at the right of the machine, for the purpose more fully hereinafter explained. As the key descends, riding upon the incline 10 of the arm 9, it carries the bar 8 to the left. The pawl 37 is raised by the ratchet 38 upon the bar 8, moving beneath it one notch. As soon as the key is released, the spring 134 draws the bar 8 to the right, which through the ratchet-bar 38 and the pawl 37 moves with it the sleeve 18, which is held in its adjusted position by the engagement of the pawl 39 with the stationary ratchet-bar 40.

Figure 14:
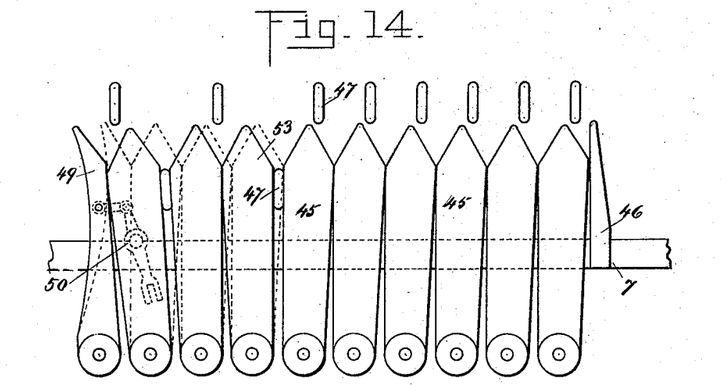
Fig. 14 is a diagram plan of the mechanism for preventing the simultaneous operation of two or more keys.
Figure 15:
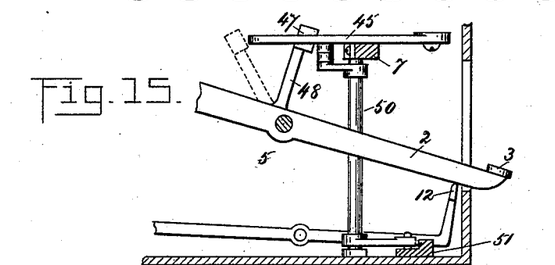
Fig. 15 is an end elevation.
Figure 16:
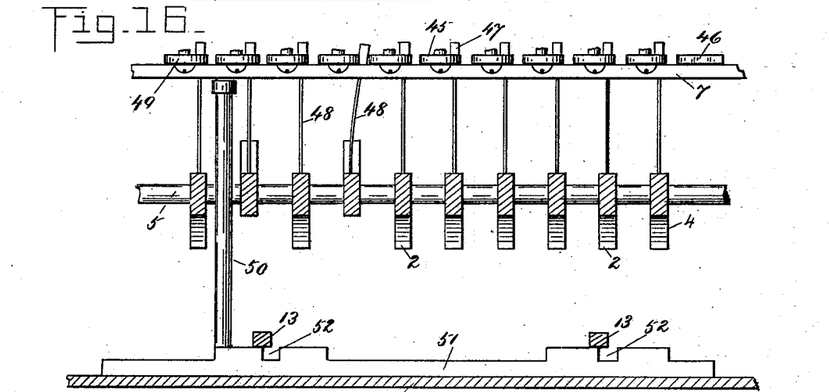
Fig. 16 is a front elevation of the same.

45, Figs. 2 and 14, are a series of horizontal tumblers pivoted at their forward ends to the case of the machine, having a bearing upon the cross-bar 7 centrally and extending with their rear ends in proximity to the wards 47, secured upon the upper end of the flexible arms 48, one connected to each of the key-levers. Upon the right of these tumblers is a fixed stop 46, preventing their movement in that direction, while the tumbler 49 upon the extreme left is connected by means of a double crank-shaft 50 (see Fig. 14) with the sliding locking-bar 51, which extends under the keys, and is provided with the slots 52, all so arranged that upon the operation of a key the ward 47 strikes the incline 53 of its corresponding tumbler and entering between it and the adjacent tumbler communicates motion through the series of tumblers to the last tumbler 49 and from it through the double crank-shaft 50 to the sliding locking-bar 51, which is moved with the slots 52 beneath the lever 13, Figs. 1, 15, and 16, which is forced down by the keys, thereby permitting the lever to enter said slot and complete its operation. When the key returns to its normal position, the lever 13 rises and the bar is returned likewise by the tension of the spring 54. Should the operator attempt to operate another key before the return of the operated key, but after the lever 13 has left the slot 52, the result would be that the operation of the second key would throw the tumblers the normal distance and in addition thereto the added distance due to the presence of another of wards 47 in the path of the tumblers, as shown in Fig. 14, which would be sufficient to throw the slots in the locking-bar beyond the path of the lever 13, in which position it would be impossible to complete the operation. In case any key were first operated to its fullest extent, in which position the lever 13 engages in the slot 52, it is evident that the second key could be depressed only partially, as any further movement of the bar 51 would be prevented by the engagement of the lever 13 in the slot 52.

Figure 6:
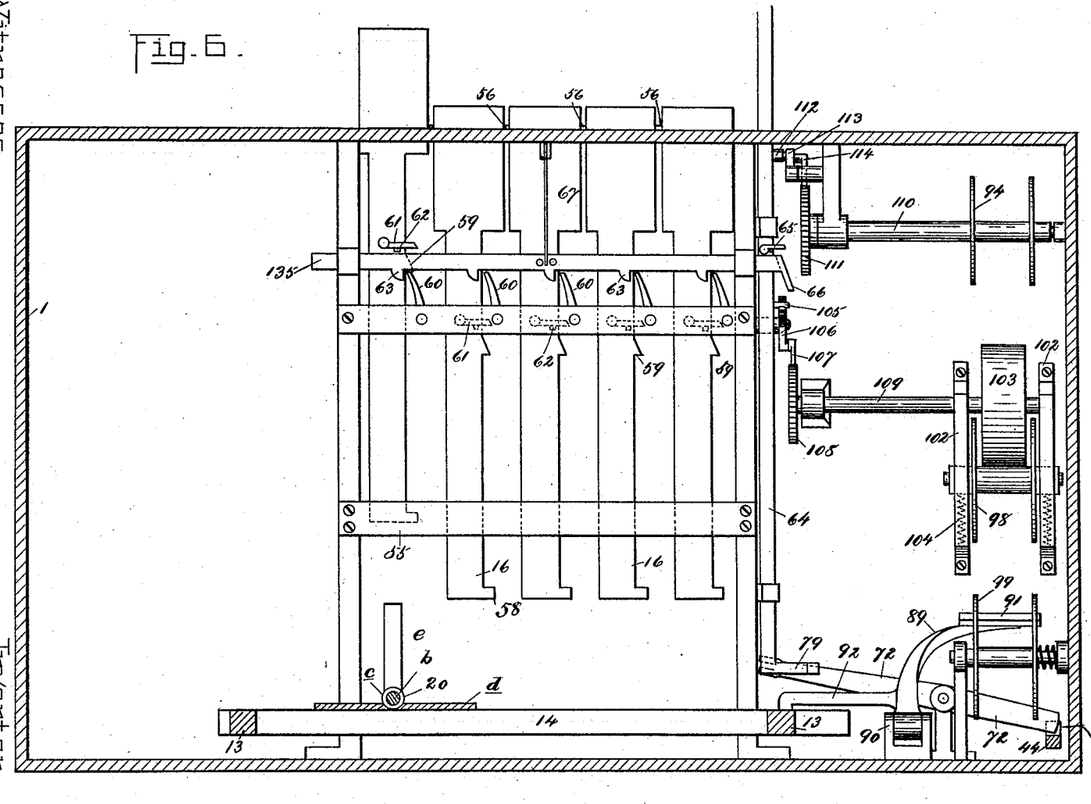
Fig. 6 is a vertical longitudinal section on line $z\ z$ in Fig. 5.

The tablet-rods are arranged in suitable guides 55 56 and carry suitable indicating-tablets, as before described. These tablet-rods are spaced a little distance apart at the bottom, but are inclined, as shown in Fig. 2, so that the tablets are close together, so that there is the least possible space between them. Each group of tablet-rods is separated a slight distance from the other. The tablet-rods of each group are provided with a foot or flange 58 to prevent accidental displacement should the machine be inverted and with a shoulder or detent 59, with which a spring-pawl 60, common to all the rods of each group, engages in the elevated position of the rod, as shown at the left hand of Fig. 6, said pawl passing across all of the tablets of its group, so that when one tablet of said group is dropped all of the tablets in that group which may be up are likewise dropped.

61 is a latch held normally in a horizontal position by a stop 62, but free to move upward. As the tablet rises the latch 61 strikes the pawl 60, throwing it out of engagement with any previously-operated tablet-rods and allowing them to drop. In the downward descent of such rods the latch swings upwardly, offering no obstacle to the movement of the rod.

135 is a tripping-bar having shoulders 63 extending into the path of the pawls 60. This bar is actuated from the rod 64, which is slidingly secured beside the tablet-rods in vertical guides and carries the latch 65, engaging in the downward movement of the rod with the top of the incline-plate 66, secured upon the end of the rod 135, tipping the latch backward; but in the upward movement of the rod the latch engages with the incline and moves the bar 135, disengaging the pawls from all of the tablet-rods, the latch passing on and above the inclined plane, and as soon as released the bar is returned to its normal position by the spring 67.

Figure 4:
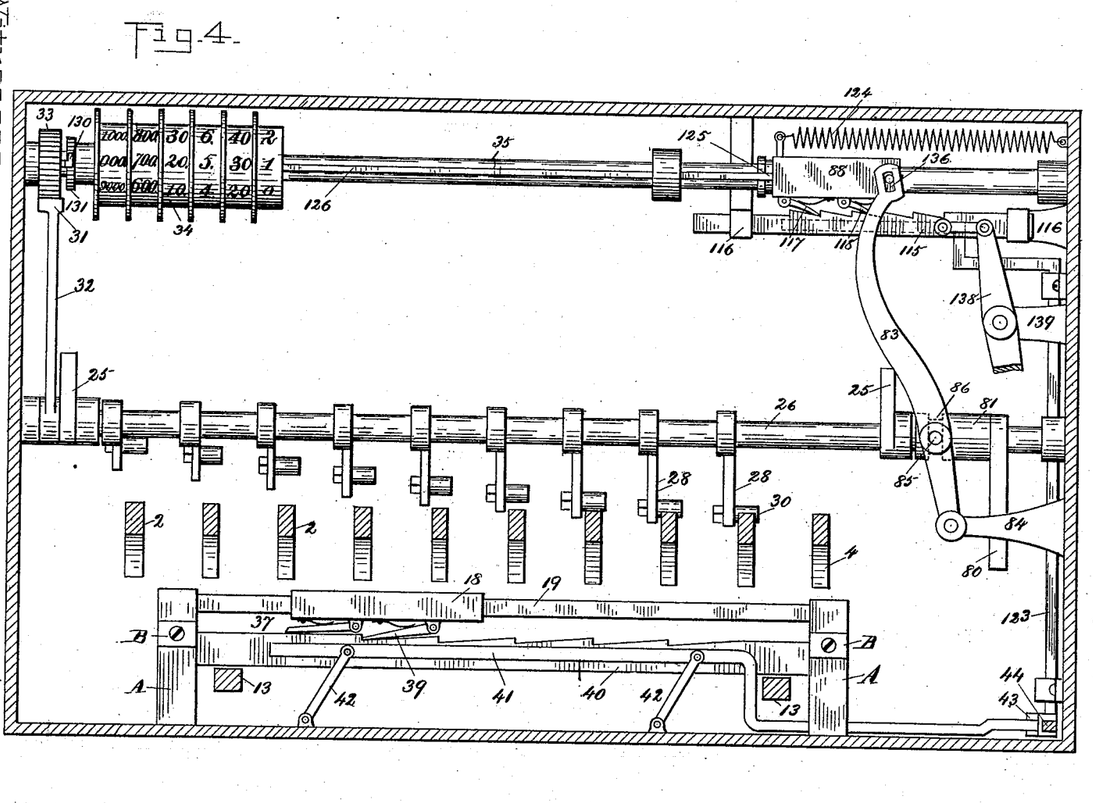
Fig. 4 is a vertical longitudinal section on line $y\ y$ in Fig. 2.
Figure 5:
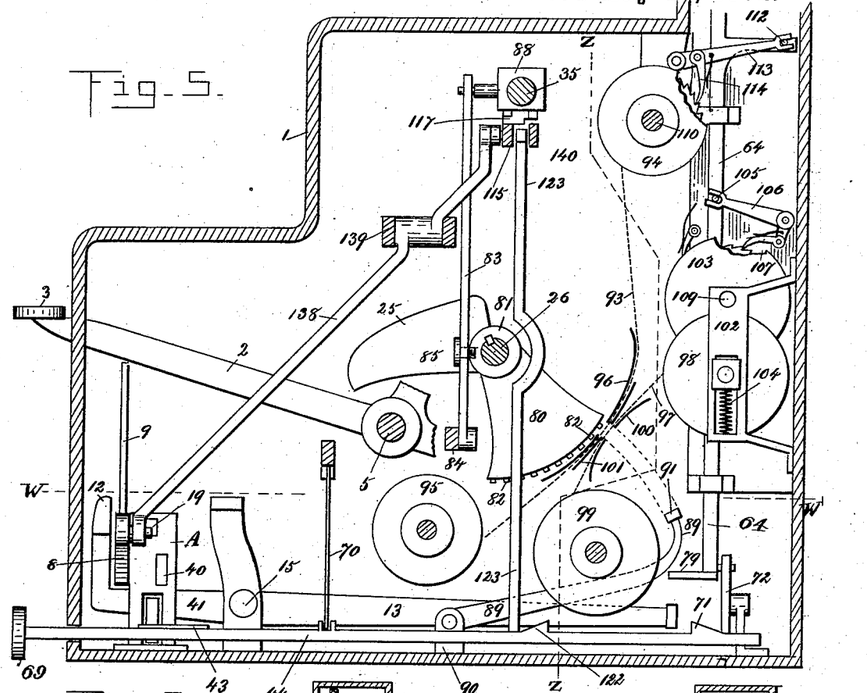
Fig. 5 is an end elevation showing the printing mechanism.
Figure 8:
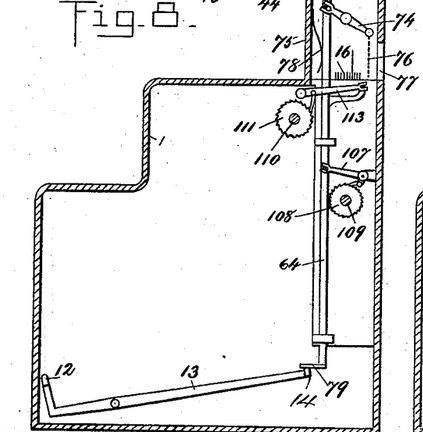
Figs. 8 and 9 are diagrams showing the operation of the hood and connecting mechanism.

44, Fig. 5, is the setting-bar, extending through the front of the machine and provided with a suitable handle 69. This bar is held in position by the spring 70. The purpose of this bar is to set the parts in position ready for each operation and to operate the hood or slide for covering and uncovering the operated tablet. Said bar carries the lugs 43 and 122, which operate, as before described, to move the lifting-bar 41, Figs. 4 and 5, and also the lifting-bar 123. It also has upon it the inclined lug 71 at or near the rear end, upon which is supported one end of the lever 72, Figs. 5 and 6, which at the other end supports the vertically-reciprocating bar 64, which at the upper end connects with the curtain-supporting lever 74, Fig. 8, pivoted in the tablet-chamber 75, formed upon the top of the machine. This lever 74 carries at its rear end the curtain or slide 76, which closes and discloses the aperture 77 opposite the elevated tablets toward the customer. A friction spring or brake 78 holds the bar in its adjusted position.

Figure 7:
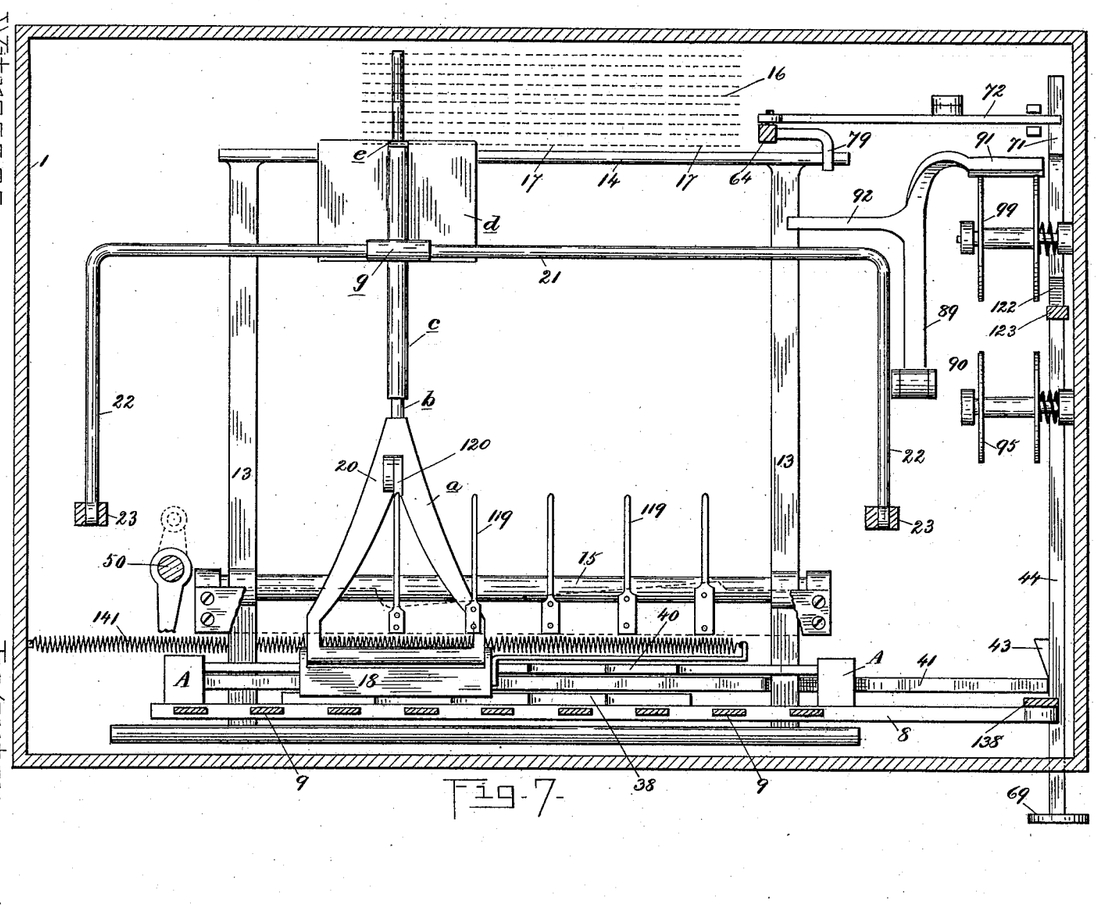
Fig. 7 is a sectional plan on line $w\ w$ in Fig. 5.

79 is an arm on the bar 64, projecting over the cross-bar 14 of the tablet-operating lever, so arranged that the upward movement of said lever will strike the arm 79 and carry with it the vertically-reciprocating bar 64, Fig. 7, thereby lowering the hood or curtain to obscure from the purchaser the indication of the amount of his purchase.

After the operator has indicated the proper amount by means of the mechanism previously described throwing up the proper tablets he pushes in the lever 44, which carries the inclined lug 71, which acts through the medium of the lever 72, connected to the bar 64, to raise the curtain and expose to the view of the purchaser the amount indicated.

My recording mechanism is of the following construction: 80 is a segmental figure-plate having an extended hub or collar 81, slidingly secured upon the shaft 26 by means of a suitable feather and feather-way. This plate, Fig. 5, is provided with a series of figures upon a segmental circular face 82. These figures correspond to the figures upon the keys—that is, consists of a cipher and nine numerals.

83 is a vertical lever pivoted at its lower end to the bracket 84 and provided with a pin 85, slidingly engaging with the annular groove 86, Fig. 5, in the collar 81. This groove is shown in dotted lines in Fig. 1. The lever 83 extends upward beyond the pin 85 and at its upper end is provided with the slot 136, engaging with the pin upon the sliding sleeve 88 upon the shaft 35, Fig. 4, carrying the registering mechanism, the operation of which will be described hereinafter.

89 is a recording-lever pivoted in suitable bearings 90 upon the base of the machine and extending upwardly and rearwardly, its rear end being provided with the hammer or head 91, arranged opposite the face of the segmental circular plate 82, Figs. 5 and 7. This lever 89 is provided with an arm 92, which rests upon the tablet-actuating lever 13 near the rear end thereof.

93 is the ink-carrying ribbon, (shown in dotted lines in Fig. 5,) which at its upper end is wound upon the spool 94 and at its lower end upon the spool 95, and is guided across the face of the plate 80 by the circular guide 96, which opposite the hammer is provided with a suitable aperture to allow the blow of the hammer to strike the ribbon against the type.

97 is a strip of paper wound at its upper end upon the roll 98 and at its lower end upon the roll 99, being guided across the face of the plate 80 by the guide 100, a suitable intermediate guide 101 being provided between the paper and ribbon, all of these guides being provided with suitable apertures opposite the hammer. These rolls are journaled upon suitable brackets attached to the frame of the machine in any suitable manner, the roll 98 being journaled in sliding bearings in the frame 102 and being operated by the friction-roll 103, the two being held in contact by the tension of the springs 104. Motion is transmitted to the roll 103 through the medium of the rod 64, which has the pin 105, engaging in the bell-crank lever 106, pivoted to the frame of the machine and carrying at its other end the pawl 107, engaging in the ratchet-wheel 108 upon the shaft 109, upon which is secured the wheel 103. As the bar 64 is lowered once after each operation of bar 44, it is evident the paper will be moved to present a new surface for each number to be recorded. Whenever said bar 44 is operated, the roll 94 is carried upon the shaft 110, which is provided at its outer end with a ratchet-wheel 111, and a pin 112 upon an arm extending from the bar 64 engages with the lever 113, pivoted at its other end to the hanger from the top of the machine. This lever carries the pawl 114, which engages with a ratchet-wheel 111, so that at each actuation of the bar 64 the wheel 94 is turned by means of the mechanism described one notch of the ratchet-wheel 111, thereby moving the ribbon to a new surface for each complete indication.

The parts being thus constructed, their operation is as follows: Upon the depression of any key—say, for instance, the key having the value of nine—the rock-shaft 26 is turned in proportion to the value of that key, as previously described, and carries the segmental plate 80, Fig. 5, with it, bringing the figure 9 opposite the aperture in the guides. When the key has traveled to this position, the pin 30 of the arm 28 passes over the end of the key-lever, which forms the arc of a circle concentric with the shaft 5, as shown in Fig. 3. The spring 36 on the segmental gear will now hold the rock-shaft stationary at its adjusted position and likewise the plate 80 during the further downward movement of the key, which now strikes the bar 12 and operates the key-actuating lever 13, which carries with it the arm 92, attached to the lever 89, carrying the hammer 91, which is thrown quickly against the paper and ribbon opposite the number, and the imprint of that number is made upon the paper. To print the next number, the key first operated is returned to its unoperated position, and by the tension of the spring 36 the rock-shaft 26 is also returned to normal position, where it is stopped by striking the pin 137, adjustably secured in the side of the frame. This motion likewise returns the plate 80 to its normal position, with the cipher opposite the aperture in the guides.

138 is a lever pivotally secured to the bracket 139, connected at its lower end to the sliding bar 8 and at its upper end to a sliding ratchet-bar 115, which latter is supported in suitable guides 116 and has ratchet-teeth upon its upper surface, with which the spring-pawl 117 engages, said pawl being secured to the sliding sleeve 88. Beside and parallel with the movable ratchet 115 is a stationary ratchet-bar 140, (shown in cross-section in Fig. 5,) with which the spring-pawl 118 engages. The bars 115 and 140 and pawls 117 and 118 are substantially the same construction as the bars 38 and 40 and pawls 37 and 39 previously described. Upon the depression of the first key the bar 8 is moved from right to left and with it the lever 138, carrying the ratchet-bar from left to right a distance of one notch, while the sleeve is held stationary in its position by the pawl 118, engaging with the stationary ratchet-bar. The pawl 117 will now be thrown into engagement with the second notch on the bar 115. The operated key being now raised, the spring 134 will move the bar 8 to the right and the lever 138 and bar 115 will return to their normal position, carrying with them by means of the pawl 117 the sleeve 88 a distance of one notch to the left. As the sleeve 88 is moved it carries with it the upper end of the lever 83 and through the connections described moves the sleeve 81 and plate 80 horizontally a sufficient distance to bring the next print of the type beside the first one. The operation of the second key will move the sleeve 88 and plate 80 another space to the left, and so on as each key is operated, thus bringing each succeeding print in its proper relative position, so that they will read in regular order—that is, the first one will represent units, the second one tens, and the third one hundreds, &c. Now in case one of these figures should be a cipher it will be observed that the cipher upon the plate 80 is always normally opposite the apertures through the paper and ribbon guides and therefore in the path of the hammer. The cipher-key will operate the tablet-operating mechanism, but has no connection with the shaft 26, there being no arm upon said shaft opposite the cipher-key. If, therefore, the cipher-key be struck at any point in the recording of a number, the cipher will be printed in its proper relation to the other numerals. The figure-plate is returned to its initial position after a number is recorded complete in the following manner: The operator pulls out the setting-bar 44, when the inclined lug 122 raises the bar 123, which at its upper end normally projects beneath the pawls 117 and 118 and lifting them allows the spring 124 to return the sleeve 88 to its initial position, carrying with it, through the medium of the lever 83, the sleeve 81 and plate 80.

My signaling apparatus consists of a series of bells or musical tines, such as 119, each bell or tine representing a different note and designed to be rung at the operation of a key, the tone or pitch indicating the denomination of the operated tablet and registering-wheel. These tines are secured over the arm 20, and as said arm rises, as previously described, a latch 120, arranged on the upper side of the arm 20, engaging with the tine, passes above it, thereby causing it to vibrate and give forth a tone of the pitch desired. I provide one of these tines for each group of tablet-rods or each registering-wheel, giving them, preferably, a rising pitch or a falling pitch, so that the proprietor of the store without seeing the indicator can tell by the tone the denomination, whether it be cents, dimes, or dollars of the sale made by the operator, and also by the number of bells that are struck the number of digits in the purchase-price. As the arm 20 is lowered to its normal position, the latch is free is rise under the tension of the spring 121 until it has passed the end of the tine and engages thereunder.

Figure 11:
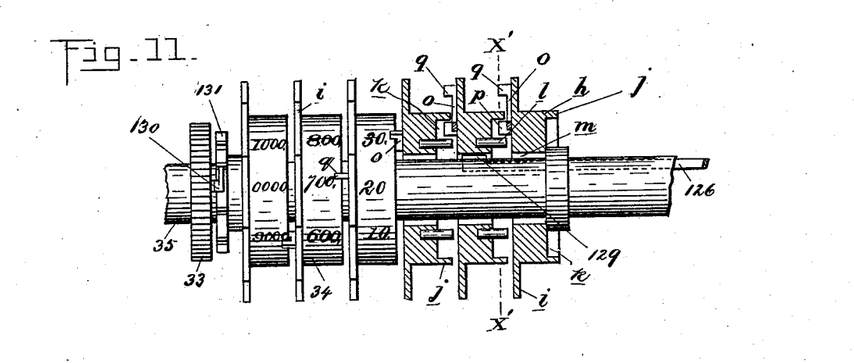
Fig. 11 is an elevation, partly in section, of the registering mechanism.

My registering mechanism is of the following construction: Sleeved upon the shaft 35 are the registering-wheels 34, which are of the following construction: $h$ is the wheel-body, which has formed upon its periphery a series of equidistant teeth $i$, being arranged upon one edge, as plainly shown in Fig. 12, and upon the other edge the lateral annular projection $j$, forming between said flange and the shaft an annular groove $k$, in which are secured a series of pins $l$, corresponding to the teeth $i$, there being ten each of the teeth and of the pins. These wheels are provided interiorly with a series of notches $m$, the intervening sections $n$ forming the bearing upon the shaft. These wheels when journaled side by side, as shown in Fig. 11, are arranged with the pins $l$ in proximity to the face of the adjoining wheel, and each is provided upon its circumference with suitable characters or figures representing the digits and a cipher. The rotation of one wheel a complete revolution turns its next adjoining wheel one notch—that is, rotates it one-tenth of a revolution—in the manner hereinafter described. Each is held normally in its adjusted position by the spring-pawl 124, carrying a roller 125, adapted to engage in the notches between the teeth $i$. The tension of the spring, with the roller, acting upon the inclined sides of the teeth, acts to bring the wheels fully and accurately to their adjusted position when moving from one notch to the next.

$o$ is a latch or carrying device moving in the space formed between each pair of adjacent wheels. This latch extends outside beside one of the teeth $i$ and having the two lateral arms $p$ $q$, the former extending within the groove $k$ of the adjoining wheel and the latter outside of the wheel.

$s$ are a series of arms arranged in the path of the arms $q$, all so arranged that at some point of rotation the latch $o$ of any wheel will strike the arm $s$ and cause the latch to project into the path of the pins $l$ of the adjoining wheel, carrying it one notch, when having passed by the arm $s$ the spring $r$ carries the latch out of engagement.

Figure 1:
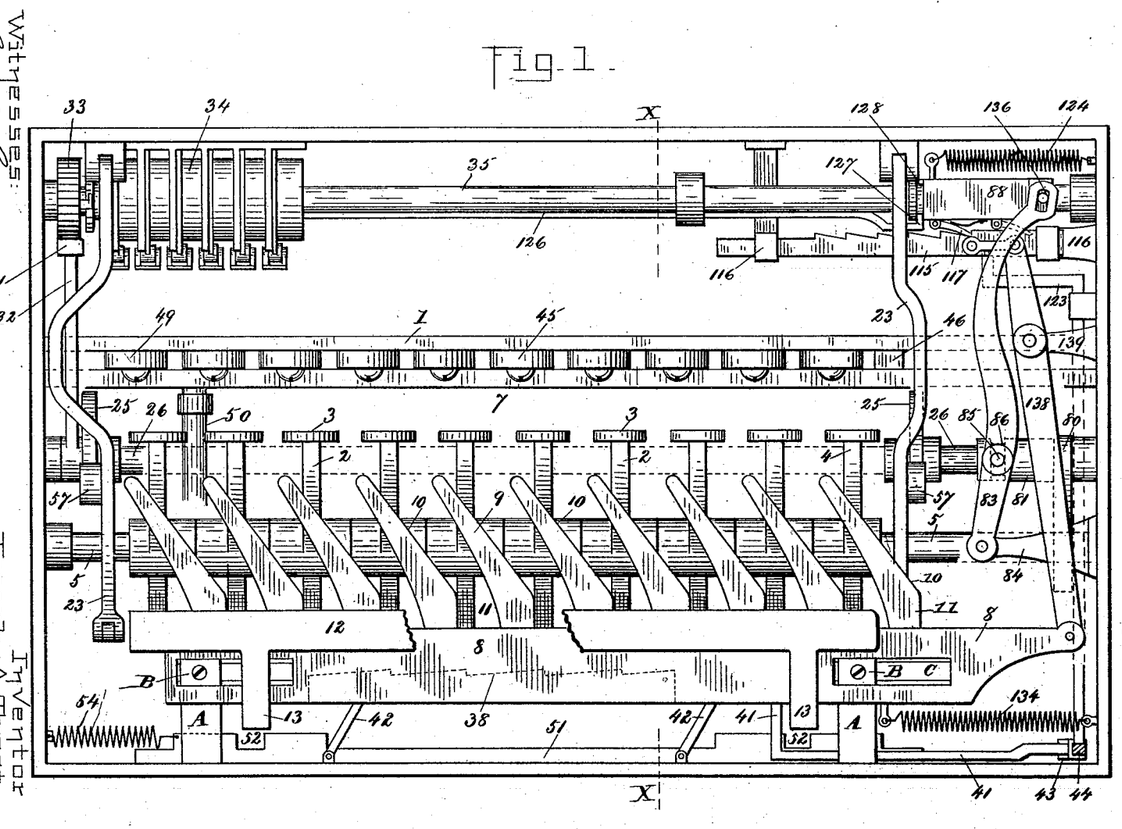
Figure 1 is a front elevation of my device, the frame and certain parts being removed.

126 is a sliding bar moving in a keyway in the shaft 35 and having a hooked end 127, engaging in the annular groove 128 upon the sliding sleeve 88, Figs. 1, 4, and 11. This bar has a key or stud 129, which in the initial position of the register engages in one of the grooves or notches $m$ in the units-wheel. The connection between the gear-wheel 33 and the shaft upon which the registering-wheels are journaled is made through the spring-pawl 130, engaging with the ratchet-wheel 131, firmly secured upon the shaft 35, said pawl moving wheel 131 in one direction only.

The parts being thus constructed, they are operated as follows: Upon the depression of a key the rock-shaft 26 is rotated proportionately to the value of that key, as previously explained, through the series of graduated rock-arms 28. The motion of this shaft also moves the segmental gear 31 a proportionate amount, which in turn communicates its motion through the pawl 130 and ratchet-wheel 131 to the shaft 35. Motion from this shaft to the registering-wheel is communicated through the stud or key 129 upon the sliding bar 126. At the operation of the first key this stud engages with the units-wheel, and the value of that key—say, for instance, the "3" key—is indicated through the slotted plate 132, or, in other words, the units-wheel is turned three notches. While this is being done the key has traveled down the incline 10 upon the arm 9 and has reached the vertical portion 11. Simultaneously the pin 30 has traveled along the top of the key until it has reached the end thereof, when it passes down across the segmental circular bearing 133, during which period the shaft 26 is held stationary. The rotation of this shaft carries with it the cams 25, against which bears the hanger 23, held in contact therewith by the spring 27. These cams are of such shape that the hanger 23 is carried backward by the spring 27 toward the tablet-rods through a distance proportionate to the amount of rotation of said shaft and by the connections described carries with it the upwardly projecting arm $e$. If a "5" key were struck, the rotation of the cam would be sufficient to carry the arm $e$ under the "5" tablet-rod in the group of tablet-rods, and if the key "9" were struck the movement of the arm $e$ would be sufficient to carry it under the "9" tablet. The cipher-key is not connected to the shaft 26 and the arm $e$ is normally under the cipher-tablet. As soon as the key enters upon the vertical portion 11 of the arm 9 it strikes the cross-bar 12, depressing the tablet-operating lever 13, which raises the movable tablet-arm 20 with the lifting-arm e and raises the tablet-rod above it which has been previously depressed, and with it its tablet, until the pawl 60 engages under the shoulder 59 and holds said tablet-rod in its elevated position. The travel of the key downward upon the incline 10 carries the bar 8 to the left against the tension of the spring 134 and carries with it the lever 138, connected to the sliding ratchet 115. The rotation of the shaft 26 turns, also, the figure-plate 80, so that the number corresponding to the key struck is opposite the apertures in the guides, and the hammer, being connected to the lever 13, as previously described, strikes against the paper and ribbon opposite that number, thus printing it upon the paper. The rotation of the shaft also rocks the segmental gear 31 proportionate to the value of the key struck, which transmits a corresponding motion to the shaft 35 through the sliding connection 129 to the units-wheel of the registering mechanism. As the lever 13 rises, it carries with it the bar 64, which through the hood and connection described covers from the observation of the customer the elevated tablet-rod, the bar 64 being held in its adjusted position by the spring 78. The elevation of the lever 13 carries with it also the arm 20, as previously described, which through the spring-latch 120 strikes the alarm or tine 119 of a pitch to indicate to the proprietor, if he be at hand, that an amount in units has been struck. As the operator releases his hold the key is withdrawn to its initial position by the tension of the spring 6. At the same time the tablet-lever 20 falls by gravity to its initial position, carrying with it the tablet-actuating arm e, and the hammer 91 of the recording mechanism also falls. The tension of the spring 36 withdraws the segmental gear 31 to its normal position without actuating the registering mechanism, as the spring-pawl 130 returns over the ratchet-wheel 131 without operating the same. The bar 8 is returned to the right by the tension of the spring 134 and carries with it the lower end of the lever 138, which moves to the left the sliding rack-bar 115, which through the connection of the pawl 117, connected to the sleeve 88, carries said sleeve, and with it the sliding bar 126, having the lug 129, which is moved to connection with one of the notches m, Figs. 12 and 13, in the registering-wheel of the next higher denomination. The movement to the right of the bar 8 and ratchet 38 through the pawl engaging therewith carries, also, the sleeve 18, and with it the tablet-operating arm 20, one notch to the right, so that the arm e extends beneath the next or "tens" group of tablet-rods. The motion of the sleeve 88 communicates motion through the medium of the lever 83, the pin 85, engaging in a slot 86 in the sleeve 81 to the figure-plate 80, carrying it to the left a sufficient distance, so that the next blow of the hammer will print a figure upon the paper in proper relation thereto to be read consecutively. With the parts adjusted in this position the operator again depresses a key of any desired denomination, and, the parts operating as previously described, a tablet-rod of the second denomination will be actuated in the tens group, a registering-wheel of the second denomination will be operated, the figure will be recorded upon the paper in the place of the second denomination, and all the parts upon the release of the key will be moved forward to connect with the next higher denomination. In this condition of the machine the proper amount will be registered and recorded; but no indication will be visible to the purchaser. In order to allow the purchaser to see what has been indicated, the operator must now push in the setting-bar 44, which, by means of the incline 71, will elevate the outer end of the lever 72, depressing its inner end and carrying with it in its downward motion the bar 64, which will raise the hood, allowing the customer to see the amount indicated by the tablets. At the same time, through the medium of the levers and pawls described and connecting with the friction-roll 103 and the ribbon-roll 94, each of these will be turned upon its axis one notch of the ratchet, bringing a new place upon the paper and the ribbon opposite the aperture in the guides for the next record. In order to register, indicate, and record a second number, the parts which have been adjusted forward to the highest denomination of the last number operated must be returned to their initial position, and to do this the operator must withdraw the bar 44. In doing this the inclined lug 43 will raise the lifting-bar 41, disengaging the pawls 37 and 39 from the ratchet, when the spring 141 (shown in Fig. 7) returns the arm 20 to its initial position. This same motion of the bar 44 causes the lifting-bar 123 to ride upon the incline 122, thereby elevating it and lifting the pawls 117 and 118, and allowing the sleeve 88 to be withdrawn to its initial position by the tension of the spring 124. The return of the sleeve 88 also carries to the right to its initial position, through the medium of the lever 83, the figure-plate 80 and the bar 126, in which position the parts are intended to remain with the tablets exposed to view until the next amount is desired to be indicated, registered, and recorded. Upon the operation of the key with the parts in this position the tablet-actuating lever 13 strikes the arm 79 of the bar 64 and causes the latch 65 to pass up the incline 66, carrying the bar 135 to the right, and with it all of the spring-pawls 60, disengaging said pawls from the shoulders upon the tablet-rods, allowing all the operated rods to drop. As soon as the latch 65 has passed above the incline 66, the tension of the springs upon the pawls 60 will throw the bar 135 back to its initial position, in which position the pawls will be free to engage under the shoulder 59 of any operated tablet-rod, as previously described.

My locking mechanism for preventing the simultaneous operation of two keys upon the tablet mechanism allows the registering of the highest of those two numbers without registering the other, but prevents the operator from effecting the indication of any amount, so that when he comes to expose to the purchaser by raising the hood the amount of his purchase the purchaser will see that nothing is indicated whatever, or if he should release one key and continue the operation of the other that an improper amount is indicated.

Figure 9:
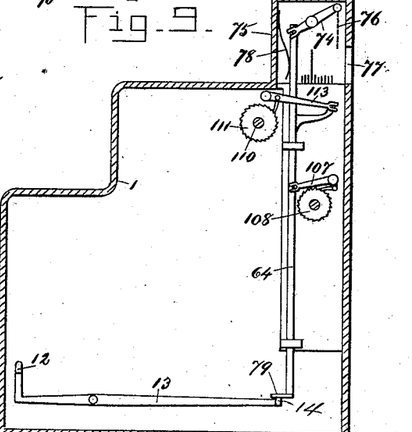

The hood obscures the indicating-tablets until the operator pushes in the resetting-bar 44, which depresses the bar 64 and brings it in such relation to the tablet-actuating lever, as shown in Fig. 9, that the operator cannot indicate any other amount additional to what has been already done without throwing down all of the operated tablets, and at the same time raising the bar 64 and obscuring from the view of the purchaser the amount indicated.

The repeated operation of a key actuating only the tablet mechanism is prevented by the fact that such repeated operation will be indicated upon the recording mechanism, thereby indicating that certain amounts have not been registered, but have been indicated and improperly recorded.

What I claim as my invention is—

1. In a cash register and indicator, the combination, with a single group of keys and a series of groups of tablet-rods, of tablet-actuating mechanism connecting with a single tablet-rod, actuated by the keys and common to all of the rods, substantially as described.

2. In a cash register and indicator, the combination, with a series of keys and a series of tablet-rods, of a laterally-movable extensible connection between said keys and tablet-rods, substantially as described.

3. In a cash register and indicator, the combination, with a series of keys and a series of groups of tablet-rods, of a laterally-movable extensible connection between said keys and rods, substantially as described.

4. In a cash register and indicator, the combination, with a series of keys and a series of groups of tablet-rods, each group representing an increasing monetary denomination, of a movable connection between said keys and rods, and mechanism for moving said connection forward to a higher denomination at each successive operation, substantially as described.

5. In a cash register and indicator, the combination, with a series of keys and a series of tablet-rods adapted to be operated thereby, of an extensible tablet-operating arm, and mechanism for extending said arm proportionate to the value of the operated key and operating a tablet-rod of corresponding value, substantially as described.

6. In a cash register and indicator, the combination, with a series of keys and a series of groups of tablet-rods, of a movable and extensible tablet-operating arm forming a connection between said keys and rods, mechanism for extending said arm proportionate to the value of the operated key, and mechanism for moving said connection forward to a higher denomination at each successive operation, substantially as described.

7. In a cash register and indicator, the combination, with a series of keys and a series of tablet-rods adapted to be operated thereby, of an extensible connection between said keys and rods, a cam secured to a rock-shaft above said keys, a spring-actuated hanger connected to said extensible connection and bearing against said cam, and a tablet-operating lever for vertically reciprocating said connection, substantially as described.

8. In a cash register and indicator, the combination, with the keys and tablet-rods, of the pivotal arm 20, carrying the tablet-operating arm e, the rock-shaft 26, the cam 25, hangers 23, roller 57, and tablet-actuating lever 13, substantially as described.

9. In a cash register and indicator, the combination, with a series of keys and a series of tablet-rods, of the sliding extensible arm 20, consisting of the sleeve 18, the frame a, rod b, sleeve c, the plate d, the guide-bearing g, and lifting-arm e, substantially as described.

10. In a cash register and indicator, the combination, with a series of keys and a series of groups of tablets, of a movable connection between said keys and tablets, mechanism for moving said connection forward to a higher denomination at each successive operation, consisting of a horizontally-reciprocating bar below the keys, inclines on said bar, one for each key, a ratchet-bar on said reciprocating bar, a stationary ratchet-bar, and pawls on said movable connection connecting with both of said ratchet-bars, substantially as described.

11. In a cash register and indicator, the combination, with a series of keys and a series of groups of tablets, of a movable connection between said keys and tablets, mechanism for moving said connection forward to a higher denomination at each successive operation, consisting of a horizontally-reciprocating bar below the keys, inclines on said bar, one for each key, a rock-bar on said reciprocating bar, a stationary ratchet-bar, pawls on said movable connection connecting with both of said ratchet rock-bars, a tripping-bar for said pawls, and a spring to return said movable connection to its initial position, substantially as described.

12. In a cash register and indicator, the combination of a single series of keys, consisting of a bank of ten, comprising nine digits and a cipher-key, a series of tablet-rods correspondingly numbered, adapted to be operated thereby, and a single lifting-arm for said tablets, substantially as described.

13. In a cash register and indicator, the combination of a single series of keys consisting of a bank of ten, comprising nine digits and a cipher-key, and a series of groups of tablet-rods, each group containing a series of tablet-rods corresponding in number to the number of keys and adapted to be operated by said keys, substantially as described.

14. In a cash register and indicator, the combination, with a single series of keys consisting of a bank of ten, comprising nine digits and a cipher-key, of tablet-rods correspondingly numbered, and an extensible connection between said keys and rods, having a single lifting-arm and adapted upon the operation of a key to operate the tablet-rod of corresponding value, substantially as described.

15. In a cash register and indicator, the combination, with a single series of keys consisting of a bank of ten, comprising nine digits and a cipher-key, of a series of groups of tablet-rods, each group correspondingly numbered, consisting of separately-movable tablet-rods arranged in line one behind the other and representing successively-higher denominations, and a sliding extensible connection between said keys and rods adapted upon the operation of a key to operate the tablet-rod of corresponding value and adapted at each successive operation to operate a tablet-rod of corresponding higher denomination, substantially as described.

16. In a cash register and indicator, the combination of a series of groups of tablet-rods, each group representing an increasing denomination, a series of operating-keys, a connection between said tablet-rods and keys, a single latch for each group, and mechanism for releasing the latch mechanism of all the groups simultaneously, substantially as described.

17. In a cash register and indicator, the combination of a bank of keys consisting of digits and a cipher-key, a connection between said digits and the registering and indicating actuating mechanism, a connection between said cipher-key and the tablet-operating mechanism, and a connection between the keys and the sliding bar 126, substantially as described.

18. In a cash-register, the combination, with the keys, of the sliding bar 8, the arms 9, having the inclined portion 10 and vertical portion 11, the connecting-bar 12 opposite the vertical portion, and the tablet-actuating lever 13, substantially as described.

19. In a cash-register, the combination of the keys, laterally-yielding wards thereon, a series of tumblers with which said wards engage, and locking mechanism connected with said tumblers for locking the operating mechanism upon the operation of more than one key, substantially as described.

20. In a cash-register, the combination of the keys and tablet-rods, a series of wards upon said keys, a series of tumblers with which said wards engage, a double-crank lever actuated by the terminal tumbler, and a sliding locking-bar having slots for the reception of the tablet-operating lever, all so arranged that upon the operation of more than one key said levers are stopped from entering said slots, substantially as described.

21. In a cash-register, the combination, with a series of keys and a series of groups of tablet-rods, of the laterally-movable connection 20, the tines 119, of different pitch, and the spring-latch 120, substantially as described.

22. In a cash-register, the combination, with a series of register-wheels marked with a series of numerals of successive higher denominations, such as units, tens, &c., and arranged so that upon the complete rotation of one wheel the wheel of the next higher denomination is turned one fractional part or notch, of a sliding locking connection engaging with one of said wheels, and mechanism for moving said connection to any of said wheels, substantially as described.

23. In a cash-register, the combination, with a series of coacting registering-wheels mounted on a shaft marked with a series of numerals of successive higher denomination, of a movable locking connection engaging with one of said wheels for locking the same to the shaft, and mechanism for moving said connection to engage with any of said wheels, substantially as described.

24. In a cash-register, the combination, with a series of keys and a series of coacting register-wheels marked with a series of numerals of successive higher denominations, of a movable locking connection with said wheels operated by said keys, and a register-actuating mechanism, all so arranged that each successive operation of a key moves the connection to a wheel of higher denomination, substantially as described.

25. In a cash-register, the combination, with a series of keys, a shaft and a series of coacting register-wheels marked with a series of numerals of successively-higher denominations, of a movable locking connection between said wheels and shaft operated by said keys, whereby each successive operation of a key moves the connection to a wheel of higher denomination on the shaft, and a latch upon said movable connection to hold said connection in its adjusted position, substantially as described.

26. In a cash register and indicator, the combination, with a single series of keys, of a series of coacting registering-wheels marked with numerals of successive higher denominations, and register-actuating mechanism, and a movable locking connection between the registering-wheels and the keys, whereby upon the successive operation of the keys connection is made with a register-wheel of higher denomination, substantially as described.

27. In a cash register and indicator, the combination, with a series of keys, of a series of registering totalizing-wheels marked with a series of numerals of successively-higher denomination, and a sliding connection between the various registering-wheels, whereby upon the successive operation of a key or keys the connection is made with a register-wheel of higher denomination, substantially as described.

28. In a cash-register, the combination of the following elements: a key, the rock-shaft 26, having rock-arms arranged at varying distances from the keys, the segmental gear 31, gear-wheels 33, pawl 130, ratchet-wheel 131, fixed upon the shaft 35, the register-wheel sleeved upon said shaft, the traveling connection 129, and the mechanism for successively connecting said part with a register-wheel of higher denomination, substantially as described.

29. In a cash-register, the combination of the keys and register-actuating mechanism, the shaft 35, the register-wheels 34, having pins $l$, spring-latches $o$, and the arms $s$ beside said wheels, substantially as described.

30. In a cash-register, the combination of the keys and register-actuating mechanism, the shaft 35, registering-wheel 34, sleeved upon the said shaft, having pins $l$, spring-latches $o$, teeth $i$, and pawl 124, substantially as described.

31. In a cash-register, the combination, with the keys and register-actuating mechanism, of the shaft 35, wheels 34, sleeve 88, rod 126, having lug 129, the movable ratchet 115, a stationary ratchet and pawl on said sleeve engaging said ratchet, the spring 124, and mechanism for moving said sleeve upon the operation of a key, substantially as described.

32. In a cash-register, the combination, with the keys and registering-wheels, of a movable connection therewith, actuating mechanism for said connection, consisting of the sleeve 88, stationary and movable ratchets, pawls on said sleeve engaging said ratchets, the lever 138, bar 8, and connection with the key for reciprocating said bar, the lifting-bar 123, and setting-bar 44, substantially as described.

33. In a cash register and indicator, the combination, with a casing having an opening therein, of a series of tablets, means for actuating the tablets, a lever, a hood on the lever between the tablets, and opening and connections between the lever, and actuating means for raising and lowering the hood, substantially as described.

34. In a cash register and indicator, the combination, with a series of groups of tablets and tablet-actuating mechanism, of a hood or slide, means for moving the same upon the operation of a key to hide the operated tablets, and mechanism controlled by the hood-operating parts for preventing the indication of an amount of lesser denomination than that previously operated until the hood has been lifted to expose the tablets, substantially as described.

35. In a cash register, indicator, and recorder, the combination, with the keys, of a recording figure-plate having a segmental face bearing figures of corresponding value with the keys and adapted to be rotated proportionally to the value of the digit to be recorded, and mechanism for moving said plate laterally at each successive operation of a key, substantially as described.

36. In a cash register, indicator, and recorder, the combination, with the keys, of a recording mechanism comprising a laterally-movable segmental figure-plate bearing figures of corresponding value with the keys, a cipher upon said plate normally in the path of the printing-hammer, and a cipher-key adapted to operate said hammer, substantially as described.

37. In a cash register, indicator, and recorder, the combination of the following elements: a series of keys, a shaft rotated upon the operation of a key proportionately to the value of the key, a figure-plate upon said shaft, a hammer, paper and ribbon strips, reels upon which said strips are wound, the bar 123, setting-bar 44, and pawl-and-ratchet connection between the bar 123 and said reels, substantially as described.

38. In a cash register and indicator, the combination of a series of keys, a series of tablet-rods, and registering mechanism, said keys having bearings connecting with the registering mechanism during the first part of its movement, and a locking-bearing for actuating means for locking the registering mechanism during the interval when a key is operating the tablet mechanism, substantially as described.

39. In a cash-register, the combination of the tablet-rods provided with a detent or shoulder, the spring-pawl adapted to engage therewith and hold them in their elevated position, and the latch 61, substantially as described.

40. In a cash-register, the combination of a series of groups of tablet-rods, each rod provided with a detent or shoulder, a pivoted pawl for each group, and actuating mechanism common to all the pawls, substantially as described.

41. In a cash-register, the combination of a series of groups of tablet-rods, each provided with a shoulder, a pivoted pawl for each group, connections between the pawls, and actuating mechanism common to all the pawls, substantially as described.

In testimony whereof I affix my signature, in presence of two witnesses, this 8th day of February, 1890.

JOSEPH A. TREAT.

Witnesses:
 M. B. O'DOGHERTY,
 GEO. A. GREGG.